(12) United States Patent
Srinivasan et al.

(10) Patent No.: US 8,955,037 B2
(45) Date of Patent: Feb. 10, 2015

(54) ACCESS MANAGEMENT ARCHITECTURE

(75) Inventors: Uppili Srinivasan, Fremont, CA (US); Vamsi Motukuru, Monmouth Junction, NJ (US); Ramana Rao S. Turlapati, Fremont, CA (US)

(73) Assignee: Oracle International Corporation, Redwood Shores, CA (US)

( * ) Notice: Subject to any disclaimer, the term of this patent is extended or adjusted under 35 U.S.C. 154(b) by 277 days.

(21) Appl. No.: 13/464,906

(22) Filed: May 4, 2012

(65) Prior Publication Data

US 2012/0291090 A1  Nov. 15, 2012

Related U.S. Application Data

(60) Provisional application No. 61/485,025, filed on May 11, 2011.

(51) Int. Cl.
*G06F 17/00* (2006.01)
*G06F 21/62* (2013.01)
*G06F 21/60* (2013.01)

(52) U.S. Cl.
CPC .......... *G06F 21/6236* (2013.01); *G06F 21/604* (2013.01)

USPC ............................................................. 726/1

(58) Field of Classification Search
CPC ............................. H04L 63/20; H04L 63/102
USPC ............................................................. 726/1
See application file for complete search history.

(56) References Cited

U.S. PATENT DOCUMENTS

| | | | |
|---|---|---|---|
| 6,516,416 B2 | 2/2003 | Gregg et al. | |
| 6,760,746 B1 * | 7/2004 | Schneider | 709/203 |
| 7,290,288 B2 | 10/2007 | Gregg et al. | |
| 2007/0240231 A1 | 10/2007 | Haswarey et al. | |
| 2010/0250729 A1 * | 9/2010 | Morris | 709/224 |

OTHER PUBLICATIONS

International Search Report for PCT patent application PCT/US2012/037625 (Jul. 24, 2012).

* cited by examiner

*Primary Examiner* — Anthony Brown
(74) *Attorney, Agent, or Firm* — Kilpatrick Townsend and Stockton LLP

(57) ABSTRACT

An access management system architecture is provided. In one embodiment, the architecture comprises modular and decoupled components, which allow composability of heterogeneous solutions.

20 Claims, 12 Drawing Sheets

| | Silo A 110 | Silo B 120 | Silo C 130 | Silo D 140 |
|---|---|---|---|---|
| Identity Solutions | Partner N/W, Hosted Apps Services | Enterprise Web-SSO | B2B Integration | Customer Portal, Social N/W & Blogs |
| Protocols | SAML | Proprietary | Proprietary, ESS / WS-* | OpenID |
| Tokens | X.509 / SAML | Proprietary | SAML, Proprietary | OpenID |
| Trust Models | Point-Point Trust | Circles of Trust | Site Controlled / Mediated | User Mediated Trust |

ACCESS MANAGEMENT ARCHITECTURE

BENEFIT CLAIM

This application claims benefit of Provisional Appln. 61/485,025, filed May 11, 2011, the entire contents of which is hereby incorporated by reference as if fully set forth herein, under 35 U.S.C. §119(e).

FIELD OF THE INVENTION

The invention relates generally to secured computing, and more generally to access management for computing systems.

BACKGROUND

Modern businesses rely on a variety of applications and systems that control and generate information that is critical to business operations. Different applications often provide different services and information, and different users may require access to different levels of information within each system or application. The level of access that users are granted may depend on the role of the user. For example, a manager may need access to certain information about employees that report to him, but it may be improper for that manager to access the same information about those whom he reports to.

Earlier less sophisticated applications incorporated access management business logic directly into the application code. That is to say, each application would require users to have a separate account, separate policy logic, and separate permissions, for example. Furthermore, when a user is authenticated by one of these applications, this authentication remains unknown to other applications in the enterprise because the fact that authentication with the first application has taken place is not shared. Thus, there is no concept of trust between applications using different systems for authentication and access control. Engineers quickly realized that having an access management system for each application in an enterprise was much like having a gas station for each car, and determined that authentication and access control would be more efficiently implemented and managed as a shared resource. These shared resources became known as an access management systems.

Access management systems often use policies and other business logic to make a determination regarding whether a particular access request should be granted to a particular resource. Upon making a determination that access should be granted, a token is provided to the requestor. This token is like a key that can be used to open a door that guards restricted data. For example, a user may attempt to access a human resources database to gather information about certain employees such as salary information. The user's web browser makes a request to the application, which requires authentication. If the web browser does not have a token, the user is asked to log in to the access management system. When the user is authenticated, the user's browser receives a cookie that represents a token that may be used to access the human resources application.

To facilitate the proliferation of access management systems, developers of such systems created agent development kits to allow application developers to easily create agents that are capable of interacting with an access management system on behalf of an application. These agents represent the logic required at the application side, and applications require less code to integrate with and use these agents than they would to include the access management logic directly into the application. However, agents are specific to the access management systems for which the agent toolkit was developed. Therefore, if an enterprise architect or engineer wishes to change the access management system used by a particular application, the agent associated with the application must also be replaced to conform to the requirements of the new access management system. Furthermore, access management systems may have different features, so that one access manager would not offer the services required by the applications in the enterprise, even if the agents were compatible. All of this makes access management systems "sticky," meaning that it is very difficult or cost-ineffective to switch applications from their reliance on one access management system to another.

As a result of the stickiness of access management systems, many enterprises either use multiple access management systems or use applications that are easily integrated with access management systems that are already employed by the enterprise. Applications are thus organized into "silos," and many of the applications are unable to take advantage of the services offered by access management systems that they are incompatible with. In such an enterprise, it becomes difficult to roll out new access management features, because integration must be performed for each access management system. In addition, users are often confused by the lack of universal integration, since the demarcation between applications using the same access management system is not easily recognizable to the user.

In cases where applications are all using the same access management system, enterprise architects are often limited in their choice of applications out of a desire to maintain an existing access management system. Therefore, even if a particular application offers superior features, the architect will often choose a different application that is already compatible with or easily integrated with the access management system that is already deployed within the enterprise, sacrificing the superior features to retain consistency.

Present access management solutions face several challenges, and existing products have been under pressure to evolve to seamlessly support emerging enterprise and Internet access management requirements. This evolution has been problematic since products use designs that are impractical to extend to accommodate emerging requirements. As a result, addition of new features is often achieved via newer product components posing disruptive and time consuming integration and implementation process.

When it comes to securing enterprise resources and enabling access to these resources by enterprise users, companies have the freedom to choose and standardize their solution around protocol standards and implementation models that best suit their needs. But when it comes to extranet, there are business motivations to accommodate and attract an expanding base of user communities representing varying levels of trust (such as business partner communities, enterprise customers and general public Internet consumers), and associated interaction models.

Enterprises have to secure varying types of resources spanning different administrative models and problem domains. On the other hand users in an enterprise often need access to resources across many such domains.

Driven by regulatory compliance initiatives such as SOX or M&A activity, enterprise Access Management players need to transition from functional product silos to a process oriented environment that consolidates various legacy stacks such that, access management and control can be applied to all IT assets in a consistent manner. But lack of consistent consolidation architectures and migration frameworks often pose insurmountable implementation challenges.

Access Management vendors have traditionally addressed the above challenges with individual products specialized for specific problem domains. The common elements of access management solutions, namely, types of tokens used to encode assertions, trust model among the parties involved, and the wire protocol standards are all inherently independent issues. But traditional products tend to create tight coupling among these elements.

FIG. 1 illustrates an example of different products tailored for different environments, each representing a specific coupling typical to the environment the product is targeted for. Because of the above tight coupling, multiple individual products need to be glued together to address the heterogeneous problem domains. This gluing/bridging ends up being the weakest link in the overall security posture since the individual products bridged are incompatible in their security models and design patterns.

These independent products are also often based on independent technology stacks, thus compounding the challenge of deploying integrated solutions for customers.

DETAILED DESCRIPTION OF THE INVENTION

In the following description, for the purposes of explanation, specific details are set forth in order to provide a thorough understanding of embodiments of the invention. However, it will be apparent that the invention may be practiced without these specific details.

General Overview

According to an embodiment of the present invention, an access management architecture is provided that is capable of addressing the above-mentioned challenges. In one embodiment, instead of independent solution silos for different problem domains, the architecture comprises modular and decoupled components, allowing composability of heterogeneous solutions. In particular, the architecture enables composition of heterogeneous programming language implemented technology stacks.

In an embodiment, the access management architecture described herein enables support for emerging technologies and seamlessly accommodating associated new protocols as they evolve. In an embodiment, composite and heterogeneous solutions that are adaptable to a customer's deployment environment are enabled. An access management solution that supports different wire protocols simultaneously while accommodating varying trust models and provisioning models for different communities, simultaneously and seamlessly is described herein.

In an embodiment, the access management architecture described herein enables integrated cross-enterprise access control capable of spanning all data and assets of an organization. In an embodiment, an integrated cross-enterprise access control solution that better manages security risk across the Enterprise is provided. In an embodiment, systematic migration of legacy technologies and consolidated management of legacy and new technology during the period of migration may be enabled.

In an embodiment, an access metadata repository maintains a repository of access metadata objects that describe data associated with access services. An access request is received from a requesting entity, and a request type associated with the access request is determined. A normalized request is generated, and a first functional component is selected to satisfy at least a portion of the first normalized access request based in part on the normalized access request and an access metadata object associated with the request type. In an embodiment, the first functional component generates at least a portion of a response, which is provided to the requesting entity. In an embodiment, the response is converted into a protocol-specific response before the response is provided to the requesting entity.

Layered Access Management Architecture

Figure 2:
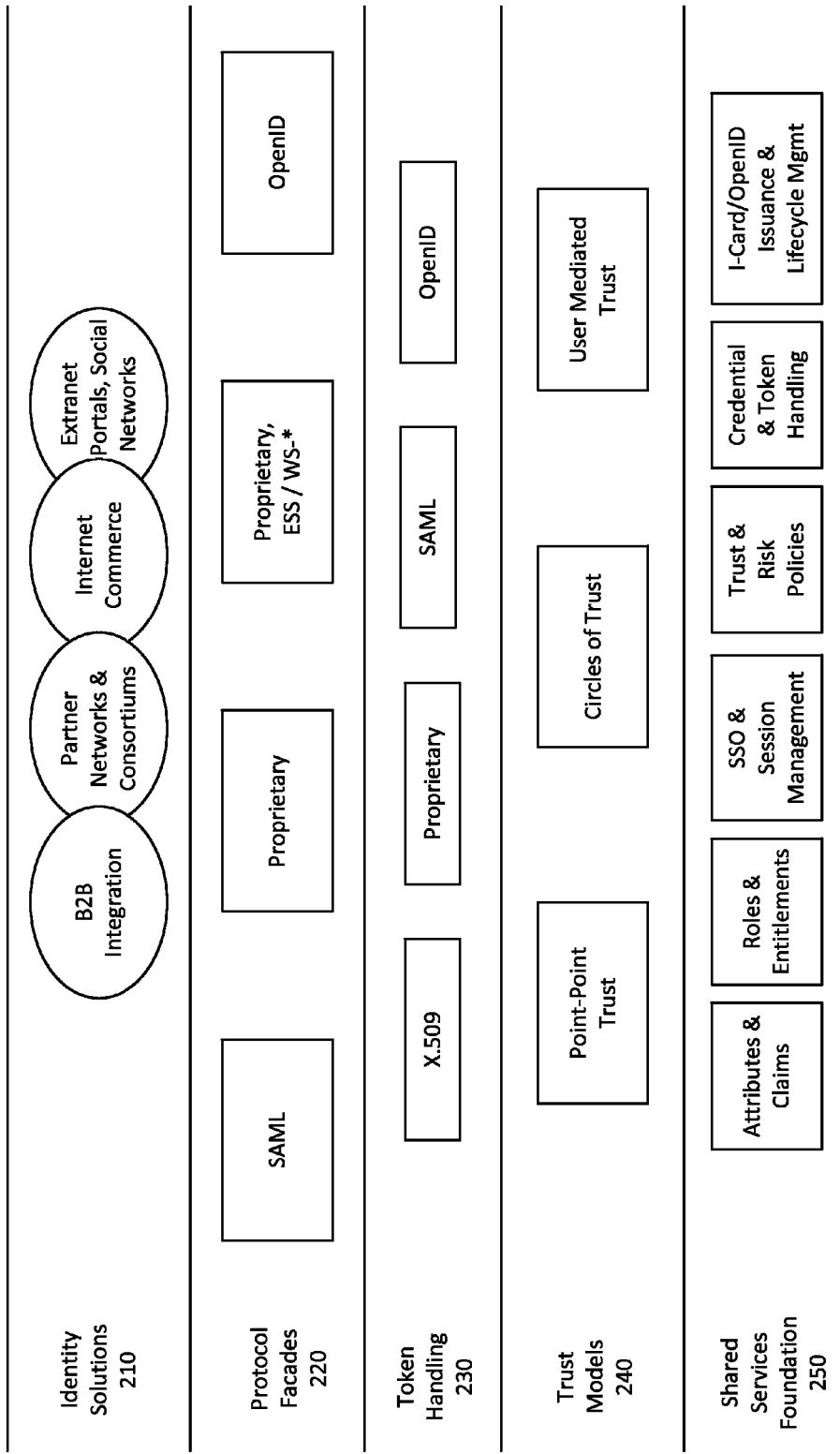
FIG. 2 illustrates an access management model according to an embodiment of the present invention.

FIG. 2 illustrates an access management model according to an embodiment of the present invention. The architecture depicted in FIG. 2 depicts a unique multi-layered architecture, with each layer comprising a category of building blocks. In the embodiment depicted in FIG. 2 the building blocks include: Identity solutions 210, protocol facades 220, token handling engines 230, trust models 240, and shared services 250.

In an embodiment, a layering model is based on the above building blocks. An orchestration controller component is used to orchestrate messages between the layers that use these building blocks, allowing communication between layers to adapt to the communication capabilities available between the layers according to the needs between layers, rather than hard-coded communication between specific components. This helps to facilitate systematic development of new capabilities and composite solutions.

An extensible foundation representing a single set of canonical real-world physical entities and mechanisms to map protocol-defined entities to their corresponding canonical representations may be enabled in an embodiment. For example, an external policy engine may be communicatively coupled to the shared services layer of an access management system using the multi-layered access model described in an embodiment, thereby extending the functionality of all services provided by the access model. This capability allows the same physical entity (such as a service, an application client or user) to be part of composite solutions spanning problem domains and protocols.

In an embodiment, patterns for identifying and packaging shareable functional components are deployable in different form factors (such as embedded, distributed etc.) with the goal of enabling a broad spectrum of customer deployment environments. In addition, a set of dedicated service facades leveraging the same composable architecture, aimed at facilitating co-existence and consolidated management of legacy technologies and while allowing gradual migration of legacy to new technology may be featured in embodiments.

In an embodiment, the multi-layered access management system utilizes an infrastructure that decouples information type from information life-cycle to enable externalizing and sharing of management and enforcement across Access Management to be externalized and thus allowing Policy decisions and session infrastructure to be decoupled/externalized. This design element facilitates consistent management and enforcement of policies across problem domains and administrative boundaries (Web Single Sign On (SSO) for enterprise resources, ID federation for partners, ID propagation and delegated access to web services, etc.).

Figure 1:
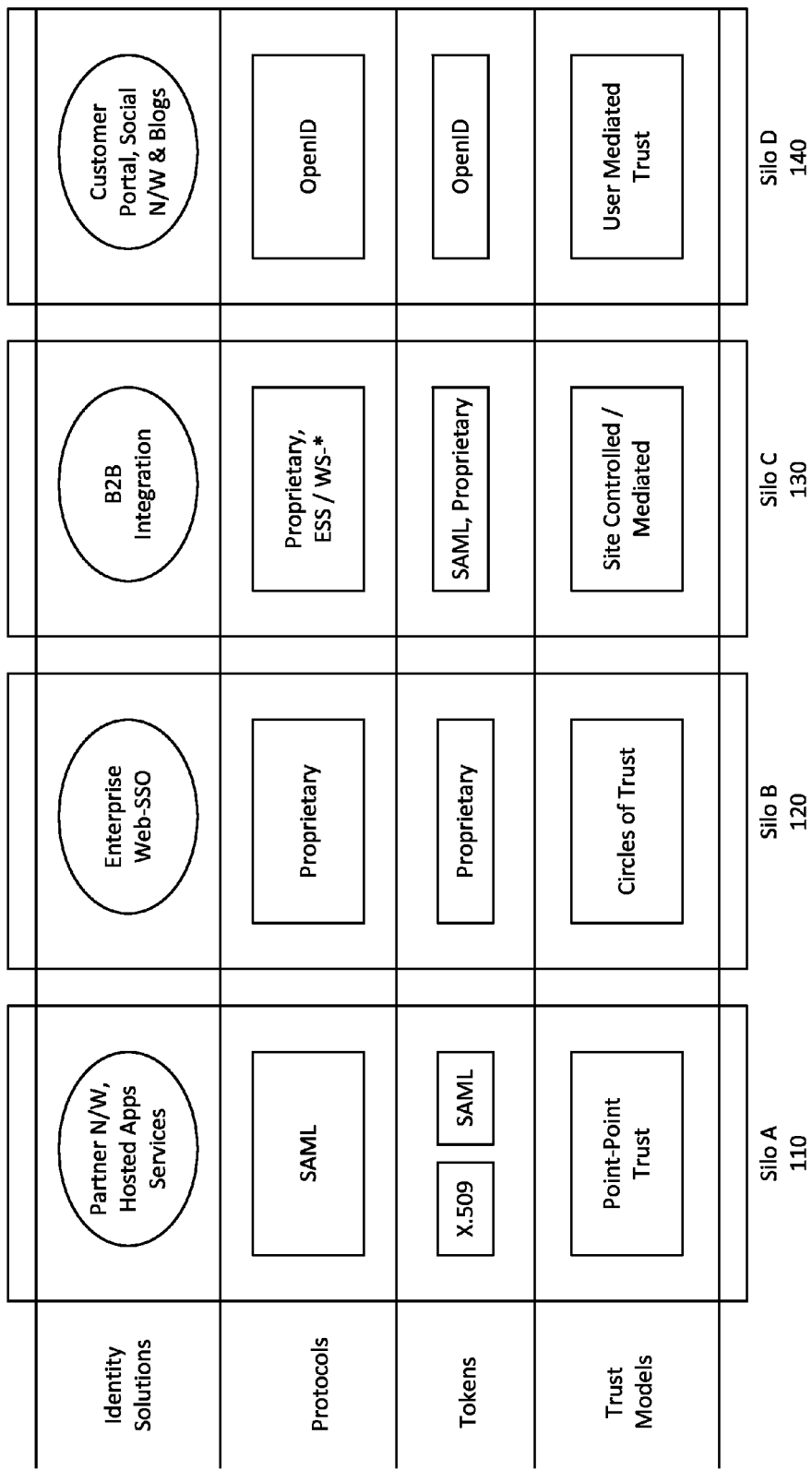
FIG. 1 illustrates an example of different products tailored for different environments.

Current access management products are based on a "silo" approach, as shown in FIG. 1. Referring to FIG. 1, silo A 110, silo B 120, silo C, 130, and silo D 140 all comprise a static set of elements that may not be altered. For example, customer portal applications may use access management solutions that only authenticate using OpenID, and may not utilize the functionality of any silo other than silo D 140. In the approach depicted in FIG. 1, each product is essentially an island. As a result, it is practically impossible to define, manage and enforce security in a consistent manner across the various silos. This fragmentation exposes chinks in the security armor of an enterprise and the growing use of the Internet has significantly increased the potential for enterprise IT assets to be comprised. To solve the above, what is needed is a transition of products from functional silos to compose-able units. This is realized through a new architecture that facilitates the transition in a phased manner for existing solutions while simultaneously delivering broad heterogeneous solutions based on emerging standards.

Figure 3:
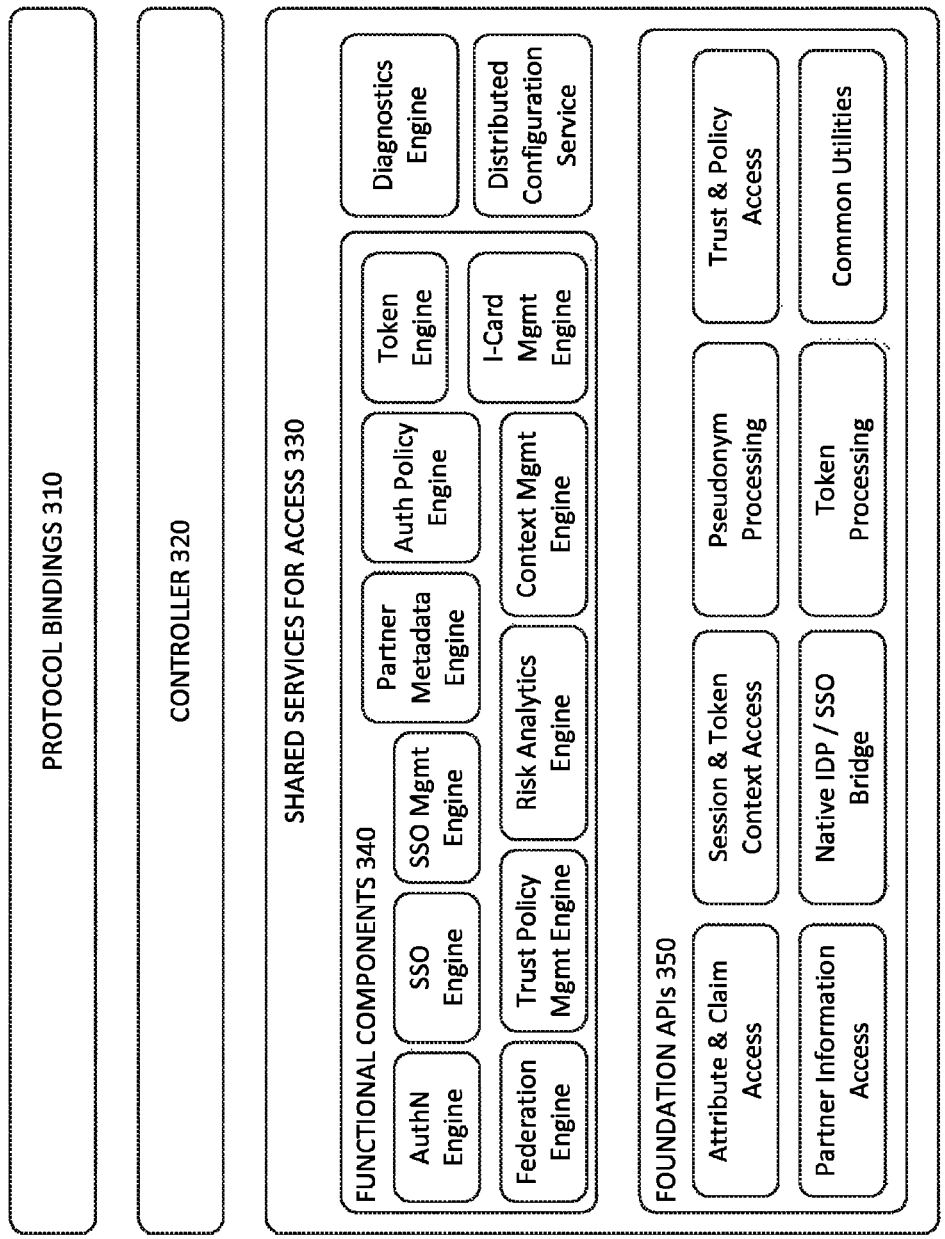
FIG. 3 depicts an access management architecture according to an embodiment of the present invention.

FIG. 3 depicts an access management architecture according to an embodiment of the present invention. The embodiment depicted in FIG. 3 provides a multi-protocol, composite, server architecture. In an embodiment, the building blocks are used in conjunction with a layering model, allowing products and composite solutions to function in a manner that is independent of any specific language, platform or technology.

The functional layering shown in FIG. 3 allows for composing any existing access management (AM) product (existing and future) while ensuring code reuse in an embodiment. Protocol bindings 310 represent the logic that maps authentication protocol messages to standard messaging and transport protocols. Protocol bindings 310 are responsible for marshaling and unmarshalling protocol response and requests respectively. Controller 320 represents the core business logic orchestration needed to fulfill protocol requests by invoking the functional components. Shared services for access (SSA) 330 represents the shared server functionality that is intended to be used by all AM products. It is composed of high-level stateful engines (foundation components) and low-level stateless engines (foundation APIs). Control is passed from the Protocol Binding layer 310 to the Controller 320 to the SSA layer 330.

In an embodiment, patterns for identification and packaging of shareable functionality make it possible for this functionality to be made available in different form factors to support a broad spectrum of solutions. The architecture focuses on interfaces and layering between layers and the entities/modules that implement the layer. Each layer provides a specific set of functionality with the lower layers providing facilities for use by the layer above. In an embodiment, this layered approach enables composition of functionality independent of packaging form factors to build composite solutions (for example, as shown in FIG. 4).

Figure 4:
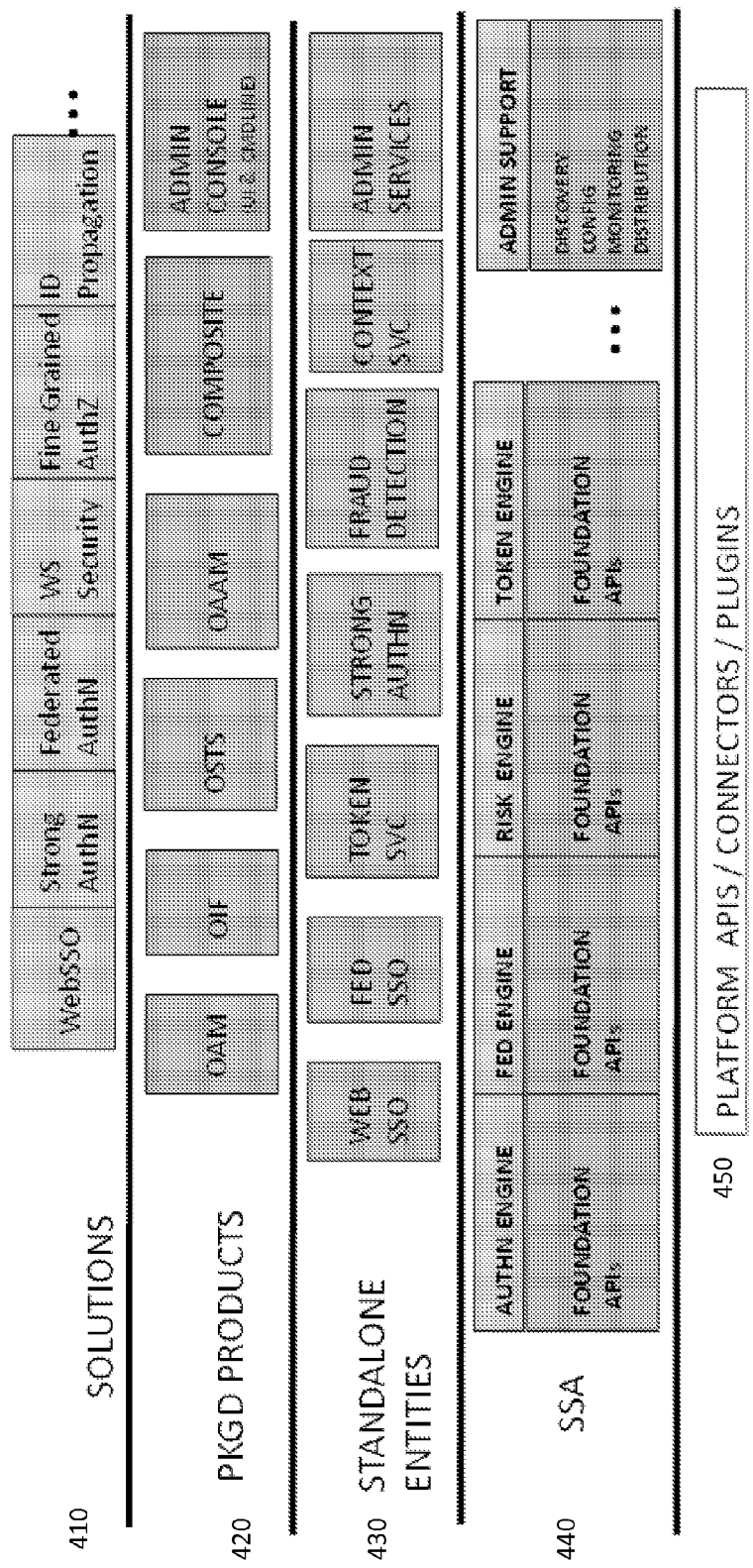
FIG. 4 depicts an access management architecture that enables different access management solutions to be authored or composed in a seamless manner through layering according to an embodiment of the present invention.

Embodiments facilitate the building of different products by allowing the different entities/modules in the various layers through composition (e.g., as shown in FIG. 4). As a result, new features/functionality and manageability may be introduced in an incremental manner.

FIG. 4 depicts an architecture that includes various solutions 410, packaged products 420, standalone entities 430, single sign-on authentication (SSA) 440, and other platforms APIs, connectors, and plugins 450. This illustration provides an example of the flexibility offered by a layered approach, rather than a "silo" approach to access management.

Figure 5:
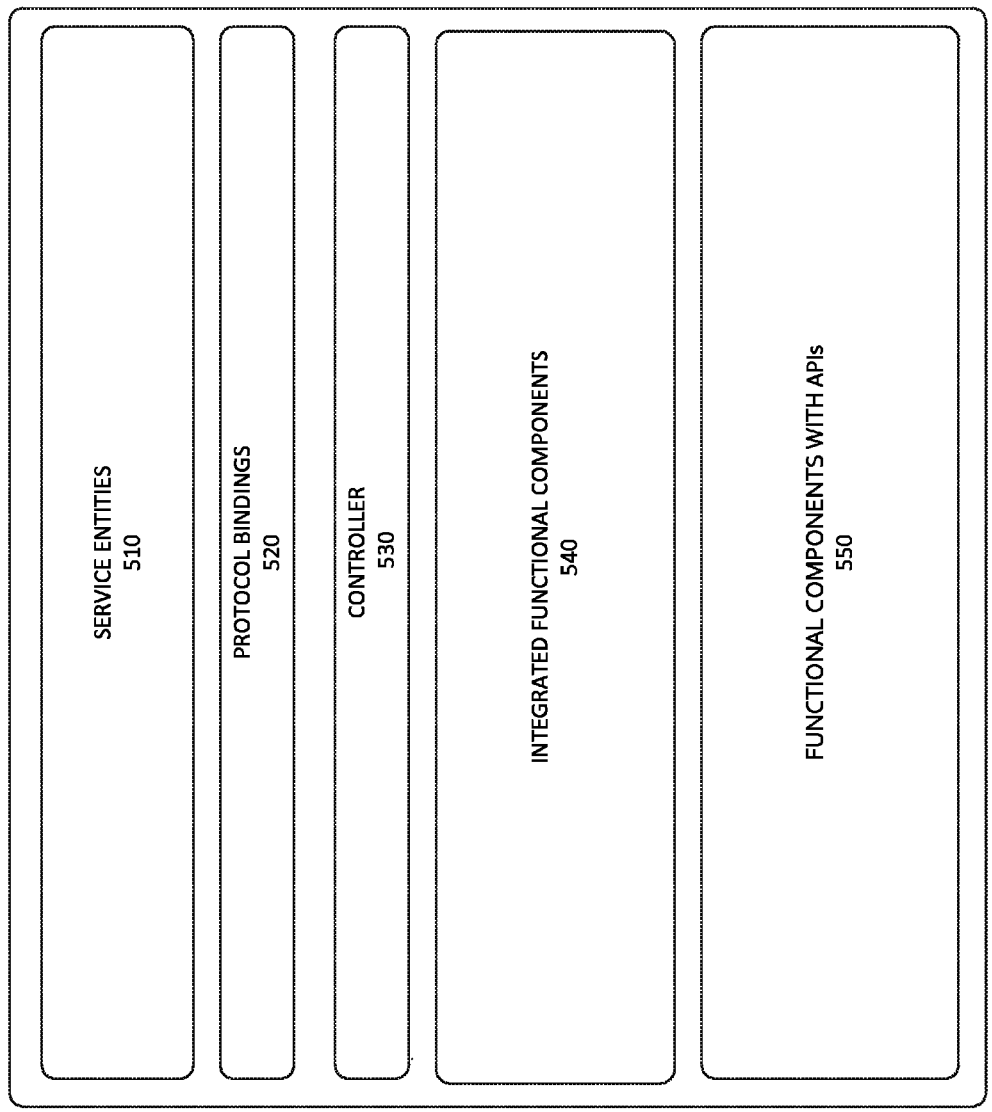
FIG. 5 illustrates a more general diagram of an access management architecture using a layered approach.

FIG. 5 illustrates a more general diagram of an access management architecture using a layered approach. The components of an access management architecture include five types of entities in an embodiment: service entities 510, protocol bindings 520, a controller 530, integrated functional components 540, and functional components with APIs 550.

Service entities 510 represent a set of functional entities packaged together as a standalone software component. Service entity(ies) are capable of being administered and managed by a customer.

Protocol binding layer 520 represents the logic that maps authentication protocol messages to standard messaging and transport protocols. Protocol bindings are is responsible for marshaling and unmarshalling protocol responses and requests.

In an embodiment, protocol binding may perform security processing and wire data optimizations (e.g. MTOM) that depend on the wire ordering of bytes, and does not perform any semantic processing of the protocol request/response. Protocol binding layer 520 leverages the transport and message protocol binding facilities provided by the underlying platform, and may be realized in programming constructs such as handlers, interceptors, plugins and library APIs.

Controller 530 represents the core business logic orchestration needed to fulfill protocol requests by invoking the functional components. In an embodiment, the controller layer 530 is decoupled from the protocol binding layer, and is transport binding agnostic. The controller layer Includes the logic to process the request by invoking the Functional Components (Engines) and Foundation APIs. Product specific business logic is isolated at the controller layer 530 in an embodiment to enable the functional components to remain unaware of details that are unnecessary to perform their individual functions. Thus, messages passed from the controller layer 530 to the functional component layers 540 and 550 are normalized to include only the information required by each functional component in an embodiment. Thus, product independent/generic logic is pushed to the engines/foundation APIs to promote modularity and code reuse across various access management components.

Functional components represent units of well defined functionality. Each functional component is tightly coupled and logically separate from other functional components. In an embodiment, component-to-component communication is only allowed through public interfaces. Functional components have an associated configuration that is user visible and is intended to be used in conjunction with other functional entities as part of a bigger service entity in service entities layer 510. A component can be decomposed into sub-components to facilitate modularity and parallel development. Integrated functional components 540 and functional components with APIs 550 differ in their level of integration to the system. For example, an integrated functional component may access an API associated with another functional component in order to extend the functionality of the access management system. This illustrates the extensible nature of a layered access management architecture. The following "engines" represent examples of functional entities that may be implemented in an embodiment:

Authentication Engine: The authentication engine is responsible for establishing the identity of a user by collecting and validating the credentials of a user using a specific authentication protocol. A User interacts with the controller (View), which delegates the authentication logic (Model+ Controller) to the authentication engine. The user interaction for credential collection is performed by the protocol/web/ presentation tier components like the controller, agents, and interceptors.

The authentication engine includes all functions necessary for applying the various authentication schemes in various combinations; supporting authentication models including the policies and control flags required by those models; customizing and extending all aspects of the authentication process including techniques, rules and protocols; and Interacting with the agent tier to drive credential collection.

Authorization Engine: The authorization engine is Responsible for the process of establishing the identity of a claimant using a specified authentication protocol. User interaction is performed for credential collection by the protocol/ web/presentation tier components like the NG-AM controller, agents, and interceptors.

In an embodiment, the authorization engine includes the functions necessary for: applying the various authentication schemes in various combinations; supporting the JAAS authentication model including the policies and control flags; customizing and extending all aspects of the authentication process including techniques, rules and protocols; and interacting with the agent tier to drive credential collection.

In an embodiment, the authorization engine supports existing schemes. Centralized and distributed identity stores are also supported in an embodiment. In an embodiment, the authorization engine supports multiple authentication schemes per resource in a combination with different control flags, and is agnostic of credential collection specifics such as protocol binding and agent environment. The authorization engine may delegate authorization services to remote or external authorization services in an embodiment.

In an embodiment, the authorization engine supports support impersonation of users by another authenticated user (e.g. administrators or support personal). The authorization engine is also capable of supporting multiple agent interaction models for credential collection in an embodiment.

In an embodiment, the authorization engine may leverage other Engine(s) and/or Foundation API(s) for needed functionality, such as session persistence, token generation/validation, or any other functionality associated with the system. In addition, the authorization engine supports migration of authentication policies and use-cases in an embodiment.

SSO Engine: The SSO engine is responsible for providing the single sign-on (SSO) experience to a user. This means that a user may "sign-in" to one application and use that token to access other applications. It accomplishes this by managing the user session lifecycle, which involving facilitates Global logout by orchestrating logout across all RPs in the valid user session.

The SSO engine supports logout orchestration and client state handling in an embodiment. In addition, the SSO engine provides support for web agents. For example, web agents may be used to "guard" access to web-based applications. When an access request is made to the application, the web agent intercepts the request, and passes the request to the access management system. After the request is normalized, the normalized request is sent to the SSO engine, which is in charge of persisting and locating client session state.

The SSO engine supports session indexing, domain scoped and resource scoped trust models, and cookie-based multi-domain and multi-zone SSO in an embodiment. In an embodiment, SSO engine leverages other Engine(s) and/or Foundation API(s) for needed functionality (e.g. session persistence, token generation).

Federation Engine: The federation engine is responsible for managing account linking with partners as well as providing federated session management services. The federation engine uses federation protocols to enable standards-based SSO across domains. The federation engine also orchestrates logout flows in an SSO environment.

The federation engine supports multiple federation protocols in an embodiment. Federation data may be stored persistently in a repository such as a database system or other storage. Various authentication mechanisms are supported by the federation engine in an embodiment, including Infocard based authentication. However, other features and functionality may be externalized. For example, security processing may be externalized in an embodiment.

Token Engine: The token engine is responsible for managing the entire token life cycle for all tokens including generation, validation, cancellation and renewal of security tokens and credentials. It includes both local and external/delegated operations with Native SSO bridges used for external operations. Maintaining a single token management engine (rather than multiple token engines across silos) ensures Improved security, maintainability and elimination of code duplication across products. The token engine also includes the functions for locating/resolving security tokens and credentials of user (s) associated with a token across protocols/components/ servers. In an embodiment, Token Processing Foundation API is responsible for handling the mechanics or structural aspects of credential and token processing.

In an embodiment, the token engine includes Multiple token generation, validation, cancellation, and/or renewal modules for any given token type. In addition, the token engine supports Username, SAML and X.509 (Validation) without requiring integration with or leveraging any existing security products/infrastructures, as these features are contained within the token engine. The token engine supports the ability for clients to submit proof tokens and other identity proofing data as input, and also supports challenge response and negotiation protocols like SPNEGO that involve multiple interactions in an embodiment. In embodiments, the token engine is capable of leveraging FIPS 140-2 cryptographic modules for token processing, and any X.509 token processing performed by the token engine supports the Federal processing rules as specified by NIST. The token engine also publishes metadata and supports dynamic discovery of engine functionality at runtime. In addition, the token engine is capable of being invoked by J2SE and J2EE clients and is portable across J2EE servers. An extensible plugin model for typed token lifecycle operations may also be supported.

In an embodiment, Structural aspects (building) of token processing are delegated to the token processing foundation API. Additional custom token types and customized token handling may also be available via the token processing foundation API in an embodiment. Security processing of tokens is externalized in an embodiment and may leverage the Partner Trust metadata engine, other Engine(s) and/or Foundation API(s) for needed functionality.

Session Management Engine: The session management engine is responsible for managing user session and token context information with support for user/admin initiated and time-out based events. The session management engine is capable of orchestrating a global lockout through the use of sessions. The session management engine is also responsible for managing tokens that are responsible for authenticating an entity throughout a session. The management of tokens that are used to maintain a session is called token lifecycle management. The session management engine is in charge of creating, updating and deleting user sessions, locating/resolving sessions associated with a token across protocols/components/servers, and creating, updating and deleting token context.

The session management engine may store active sessions in a database or repository. In an embodiment, inactive session information remains available for a configurable time after session expiration. For example, the time for which a session may remain available may be entered via a user interface.

In embodiments, the session management engine may also: be capable of notifying registered listeners on specific session events, support In-Memory and RDBMS session persistence, support distributed in-memory session persistence, be indexed by a Username, GUID and Username-ProviderID, be capable of supporting session indexing.

Card Management Engine: Cards (including iCards) enable people to organize their digital identities and to select one they want to use for any given interaction. The card management engine is responsible for managing the lifecycle of CardSpace compliant and other card types. It is key functionality needed to support user centric identity models and is invoked by the IDP's controller upon Card related protocol messages.

Trust Policy Management Engine: The trust policy management engine enables management and access of trust policy information and decisions based on these policies. The trust policy management engine is responsible for the management for trust relationships with peer entities involved in interactions. Trust policy is directed to trust between entities, and not between users. For example, two applications may establish a trust relationship with one another, enabling those applications to share data with one another.

The trust policy management engine consists of the functions necessary for: Making trust determinations about interacting entities; Managing the trust relationships; and Resolving/Converting protocol specific entity identifiers to a canonical representation.

Partner Metadata Management Engine: The partner metadata management engine enables management and access of meta-data related to partners and consolidates metadata for centralized management for better control and compliance. Invoked upon both admin and protocol operations.

The partner metadata management engine consists of the functions necessary for creating, updating, and selecting metadata in an embodiment. It may also include functions for locating/retrieving metadata needed to interact with a partner using a specific protocol to access a specific target. The partner metadata management engine maintains a registry for all partner information, and uses a lightweight storage mechanism for high performance. Each metadata object is self-describing, and therefore the partner metadata management engine may store any type of metadata required that conforms to this aspect of the metadata.

Native SSO Bridges: The native sso bridges perform functions related to active integration with 3rd party SSO/Policy Services that employ SSO Policy Server specific semantics and complexity.

Foundation APIs 350 represent additional functionality that is available to the access management system via APIs, rather than via direct integration.

Structural and Functional Overview

Figure 6:
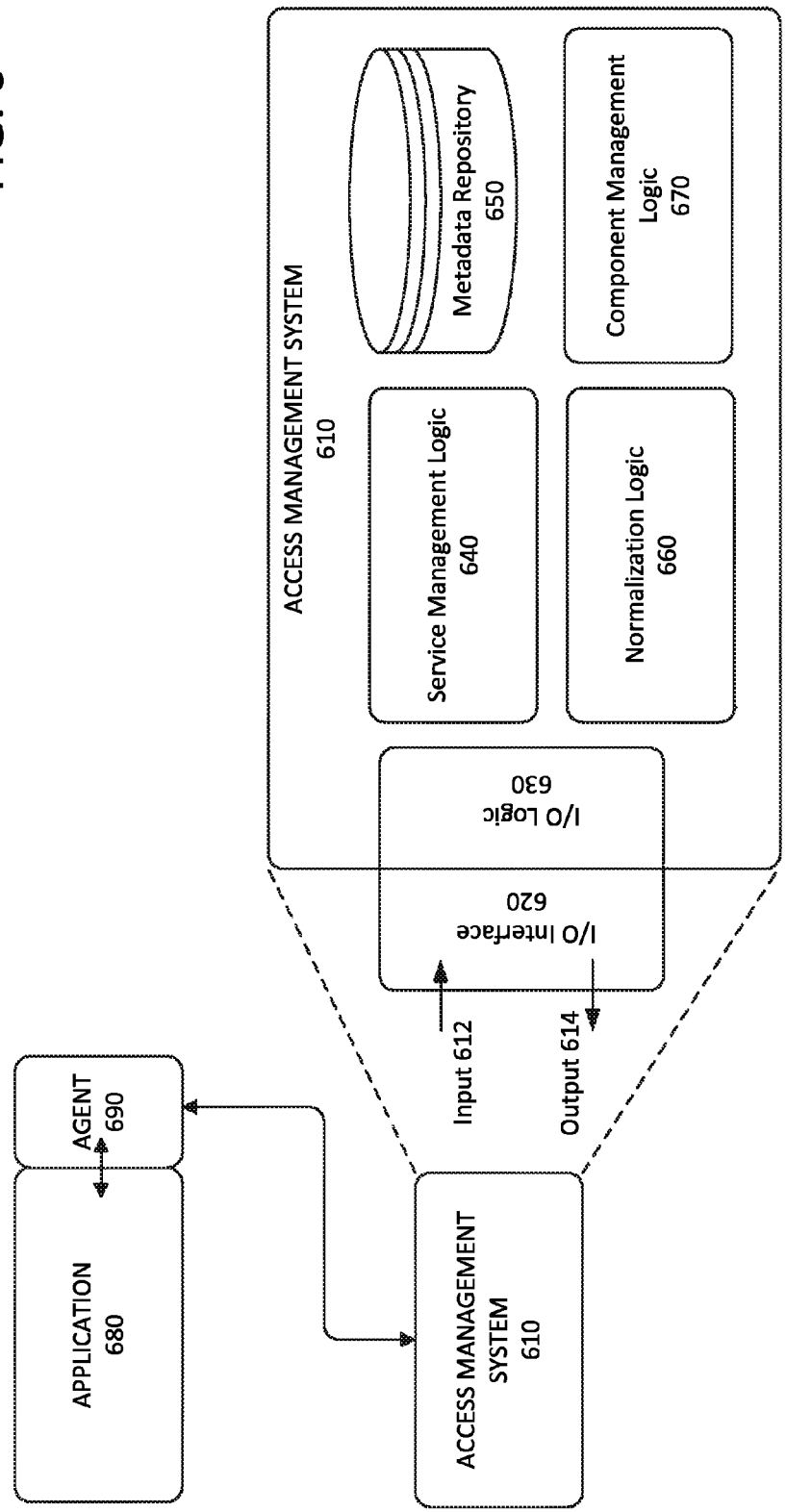
FIG. 6 is a simplified block diagram illustrating an access management system on which an embodiment may be implemented.

FIG. 6 is a simplified block diagram illustrating an access management system 610 on which an embodiment may be implemented. In the embodiment shown in FIG. 6, access management system 610 is a collection of entities 630, 640, 650, 660, and 670, each of which may be implemented in logic such as software logic, hardware logic, or any combination thereof. Access management system 610 includes an input/output (I/O) interface 620 in an embodiment. In another embodiment, I/O interface 620 is not part of access management system 610, but is coupled to access management system 610. I/O interface 620 may be configured to couple access management system 610 to a network or a user input device such as a keyboard, mouse, or any other user input device. I/O interface 620 may also be configured to access management system 610 to other devices or means of providing or interpreting signals or data such as an input 612, including a network, display device, or transmission media device capable of transmitting or displaying an output 614. In an embodiment, I/O interface 620 may represent multiple I/O interfaces.

Input 612 may include input from a web application such as application 680 or an agent such as agent 690 in an embodiment. Agent 690 may be configured to intercept access requests from a user such as an access request issued from a user's web browser software or other software or hardware. These requests may be directed in whole or in part to access management system 610 in the form of input 612.

In an embodiment, access management system 610 includes an I/O logic 630 configured to receive input 612 from I/O interface 620. I/O logic 630 may be configured to store input 612 or information associated with input 612 in non-transitory media, such as volatile or non-volatile storage media. For example, I/O logic 623 may include logging logic. I/O logic 623 is communicatively coupled to service management logic 640, metadata repository 650, normalization logic 640, and component management logic 640 in an embodiment.

In an embodiment, service management logic 640. Service management logic 640 manages service entities associated with service entities layer 510. These service entities may include protocol-specific listeners that listen for requests of a particular type, for example. When a request is received by a service entity, that request is passed to normalization logic 660 in an embodiment.

In an embodiment, access management system 610 includes normalization logic 660. Normalization logic 660 implements the features discussed above with respect to the protocol binding layer 520. Normalization logic 660 receives protocol-specific requests from service management logic 640 in an embodiment. Normalization logic 660 then normalizes the request by providing only non-protocol-specific information to component management logic. In addition, normalization logic 660 may provide metadata from metadata repository 650 to component management system 370 in order to describe the response details expected from component management engine 670 in response to the normalized request. As used herein, the term "normalized request" is a request that is different than the original request on which the normalized request is based." metadata repository 650 is used to store metadata and other data in an embodiment.

In an embodiment, access management system 610 includes component management logic 670. Component management system 670 orchestrates the performance of all activities associated with incoming requests. Specifically, component management system determines, based on the information provided by normalization logic, which functional components 540 and 550 are required to satisfy a request, and directs those components to perform their respective functions.

Example Configuration Metadata

In an embodiment, normalization logic 660 provides configuration metadata to component management system 670. The configuration metadata and other metadata may be referred to as access metadata objects. This metadata is stored in metadata repository 650 or other tangible storage media in an embodiment. The purpose of the metadata is to provide details to component management engine 670 that helps component management engine 670 fulfill and orchestrate requests. Specifically, each metadata object may represent a particular type of request, and include instructions to component management engine 670 regarding how to handle the request, including which functional components should be used to honor a request and what type of response is expected by normalization logic 660 at the protocol bindings layer 520.

Although any configuration metadata format or data source may be used to accomplish the communication between layers described above, the following XML code represents a sample configuration schema that may be used in an embodiment:

```
<Configuration>
    <Providers>
        <!- Describes how to customize processing
        <!- Describes how to override the default logic
        <Provider>
            <!- Describe a Provider that provides
                specific business logic or security functionality
        </Provider>
    </Providers>
    <Setting>
        <!- Describes how to hook into my surrounding
            infrastructures
        <!- Describes message exchange semantics
        <!- Describes the generic functionality
        <!- Describes capabilities and how to implement them
        <Setting Type="">
                .... Any <Setting> or parent <Setting> defined
                    information
        </Setting>
    </Setting>
    <SettingHandlers>
        <SettingHandler> Responsible for processing a specific
            <Setting> Type
        </Setting>
    </SettingHandler>
    </SettingHandlers>
</Configuration>
```

A more specific example that uses this configuration schema follows:

```
<Configuration Version="1.0" ProductName="Oracle NG-SSO"
  ProductVersion="11gR2" ReleaseVersion="11.2.1.0.0"
  Description="The Oracle NG-SSO Product Configuration>
<Providers>
            <Provider Name="DefaultAuthN" Version="1.0"
                Type="Authentication" SubType="Step"
                ImplementationClass="oracle...MyAuthNProviderImpl">
            </Provider>
            <Provider Name="CredMapperPlugin" Version="1.0"
                Type="Authentication" SubType="Plugin"
                SubSubType="CredentialMapper"
                ImplementationClass="oracle...MyCredMapperImpl">
            </Provider>
            <Provider Name="DefaultAuthz" Version="1.0"
                Type=Authorization SubType="Jaas-Oz"
                 ImplementationClass="oracle...MyAuthzImpl">
            </Provider>
            <Provider Name="MyClaims" Version="1.1"
                Type="ClaimsProvider" SubType=""
                ImplementationClass=""><Provider>
            </Provider>
</Providers>
<Setting Name="MyPartnerTrustManager">
        <Setting Name="Partner.1" Type=Map>
            <Setting Name=URI Type=URI>http://abc.com</setting>
            <Setting Name=Keys Type=string>Asymmetric</Setting>
            <Setting Name=CertValues Type=string>abc</Setting>
        </Setting>
            <Setting Name=AdminPassword Type=Password">%$#^&</Setting>
    </Setting>
</Setting>
<SettingHandlers>
  <SettingHandler Name="Map" Type="Map" Class="oracle....MapHandler">
  <SettingHandler Name="Boolean" Type="Boolean"
Class="oracle....BooleanHandler">
  <SettingHandler Name="Keystore" Type="KeyStore"
Class="oracle....KeyStoreHandler">
  <SettingHandler Name="String" Type="String" Class="oracle....StringHandler">
  <SettingHandler Name="Path" Type="Path" Class="oracle....PathHandler">
```

```
<SettingHandler Name="Enum" Type="Enum" Class="oracle....EnumHandler">
<SettingHandler Name="Password" Type="Password"
  Class="oracle....PasswdHandler">
<SettingHandler Name="URI" Type="String" Class="oracle....URIHandler">
</SettingHandlers>
</Configuration>
```

The information to be captured by the configuration is more important than the form of the configuration information. In other words, it is less important that the configuration be implemented in XML as shown above, and more important that enough information is captured in the configuration file to be instructive to component management logic 670. The information that may be captured in embodiments includes product behavior, product bindings, product backend integration, and product extensions.

Examples of product behavior include authorization, metadata & trust model information, including authorization information such as Windows native auth/username/X.509/, and other common functionality such as debug/timeout/audit/throttling information. Examples of product bindings include security information such as HTTP basic/digest, OAP (Oracle Access Protocol)/SAML/OpenID Simple Sign, Infocard/Higgins information. Bindings may also include non security information such as metadata, HTTP transport, message encoding, or other similar information. Product backend integration information may include information about user data stores, partner trust, ID admin and access management infrastructures, and audit, logging, and monitoring information. Product extensions may include bindings, integration, and behavior extensions.

Handling Access Management Requests

Figure 7:
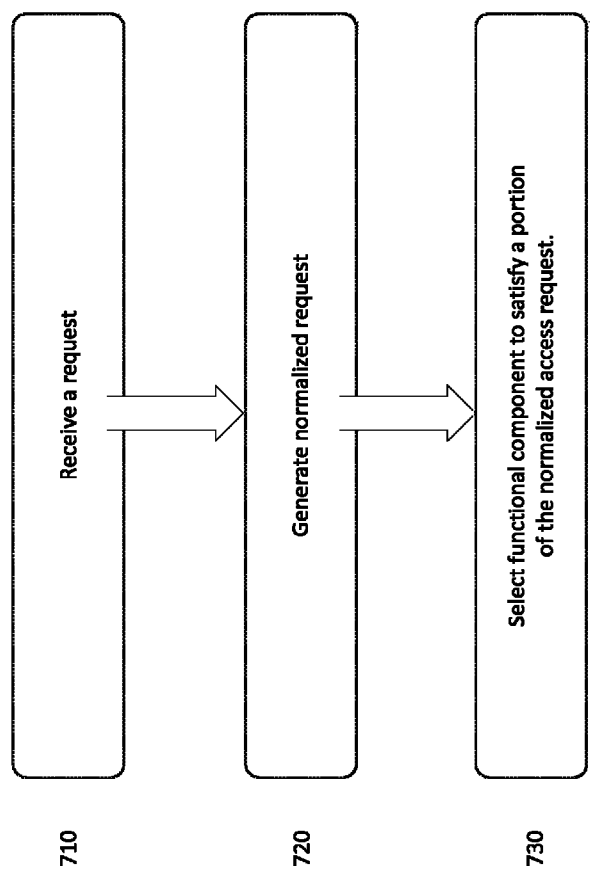
FIG. 7 is a flow diagram illustrating functions of an access management system on which an embodiment may be implemented.

FIG. 7 is a flow diagram illustrating functions of an access management system on which an embodiment may be implemented. At step 710, a request is received. For example, the request may be a request from an application such as application 680 or an agent such as agent 690. The request may include a request for authentication, authorization, or any other service supported by functional component layers 540 and 550. The request may be received by access management system 610 as input 612 via I/O interface 620 in an embodiment. For example, I/O interface 620 may provide the request to I/O logic 630 for processing in an embodiment.

At step 720, a normalized request is generated. For example, normalization logic 660 generates an altered version of the request that may include more, less, or different information than the original request. The request may include protocol-specific information that is not included in the normalized request in an embodiment.

At step 730, a functional component is selected to satisfy at least a portion of the normalized request. For example, if the request is a request for a token, the token engine may be selected by component management logic 660 as the functional component to satisfy the request. If the request requires additional services from other functional components, those components may also be selected to participate in honoring the request by component management logic 660 in an embodiment.

Figure 8:
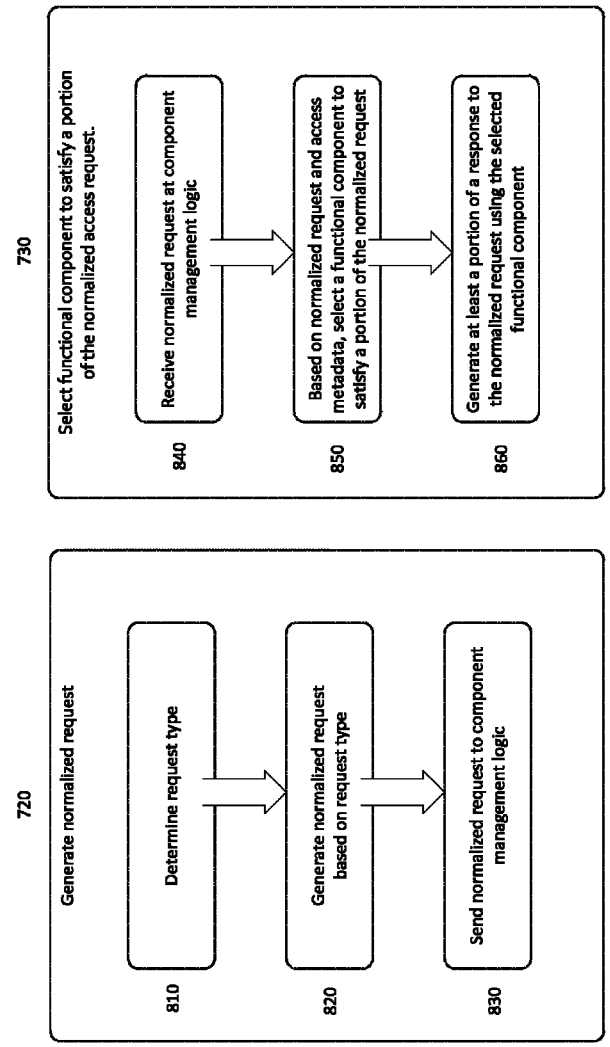
FIG. 8 is a flow diagram illustrating functions of an access management system on which an embodiment may be implemented.

FIG. 8 is a flow diagram illustrating more specific functions of an access management system on which an embodiment may be implemented. These specific functions are associated with steps 720 and 730 of FIG. 7.

At step 810, a determination of what type of request has been received is made by service management logic 640. For example, the request may be a web SSO request. At step 820, the normalized request is generated based on the request type. For example, the normalized request may include a portion of the web SSO request, without protocol-specific information. At step 830, the normalized request is sent to component management logic 670, along with access metadata from metadata repository 650 that describes the information needed to orchestrate the generation of a response to the request.

At step 840, the normalized request is received from normalization logic 660 at component management logic 670. The request may or may not include access metadata. If the request does not include access metadata, access metadata may be retrieved from metadata repository 650 in an embodiment. At step 850, a functional component is selected to satisfy at least a portion of the normalized request based on the normalized request and the access metadata. At step 860, the selected component generates at least a portion of a response to the normalized request.

In an embodiment, the response that is generated in response to the normalized request is provided by component management logic 670 to normalization logic 660, which then provides a complete response to service management logic 640. The complete response may include several partial responses that were generated by different functional components in an embodiment. For example, a response may include authentication and authorization information, along with a token, all generated by different functional components. The response may be sent to the requesting entity using the expected protocol-specific format, as protocol-specific information is provided by component management logic based on the configuration metadata.

In an embodiment, the requesting entity may be an application or an agent that performs services for an application. For example, an agent may intercept certain types of requests such as authorization requests, and handle those requests by communicating with the access management system 610. The request may be a request for a token that will allow the application to access a second application. In response to the request, the token engine may generate a token that authorizes the first application to make changes associated with the second application on behalf of a user of the first application.

In an embodiment, a request may include a request for a token associated with an identity provider. Normalization logic 660 generates a normalized access request, which is provided to component management logic 370, which selects the token engine to satisfy the request. Thus, the same token engine that was used to generate a token for the first request is also used to generate a token for a second, different type of request.

In an embodiment, some or all functional engines retain some state. That state is provided to each functional engine in the form of a token or cookie sometimes or every time the server is accessed. For example, the user may access a resource and establishes the cookie with the functional component that provides access to the resource. The cookie is given back to access management system 610 when another access occurs. In an embodiment, multiple functional engines may be associated with a portion of the same state information (i.e., the same cookie). This state information comes through the protocol binding layer, and is then sent to the controller. The controller provides state information access to all of the functional engines. In an embodiment, the request includes composite state information that identifies a state associated with a first functional component and a state associated with a second functional component.

In an embodiment, an access policy repository is configured to store access policy metadata for determining whether a request for access should be granted. In an embodiment, a policy management functional component is configured to generate a response that includes information associated with the access policy metadata to the first requesting entity in response to determining that the first normalized access request does not meet the criteria specified by the access policy metadata. For example, the metadata may specify an error message associated with a policy failure. This error message may be returned in response to determining that the request does not meet criteria specified by the access policy metadata.

Policy Enforcement in an Access Management System

An access management policy is a deliberate plan of action to guide decisions and achieve intended access control outcomes. An access management policy is applicable to the process of authentication, authorization and auditing. Authentication policies are used to establish the identity of the requestor, while authorization policies are used to determine whether or not to allow the requestor to perform a requested action on a target.

There are at least two types of policy enforcement. These include information based policy enforcement and decision service based policy enforcement. In information based policy enforcement, policy evaluation is performed by the enforcement point. In addition, policy object types and schemas are published, and the enforcement point is interested and aware of the structure and representation of the policies. In decision based policy enforcement, policy evaluation is outsourced by the Policy Enforcement Point to the decision service. In addition, the enforcement point is interested only in the decision, and is not interested in or aware of the structure or representation of the policies used for enforcement.

In an embodiment, policy enforcement may be implemented in an access management solution using the layered approach described herein. For example, a policy engine may be implemented as an integrated functional component or a functional component with an API in embodiments. In an embodiment, policy decisions associated with authorization, risk, fraud, and trust brokering are contemplated for a wide variety of information access and services. Any policies may be implemented because of the plug-in friendly layered approach in an embodiment, but the following have been specifically considered: AuthN Rules—Credential Collection Rules, Chaining Rules, Forced AuthN; SSO—Purpose, Scope, Session Lifetime; I-Card—Types, Claims, Data Handling; Trust—Issuers, Recipients; Federation—Account Linking Rules, Profile Support, NameID Selection; Message Formatting—Use of Signing/Encryption, Encoding and Optimization; Auditing and Logging—Mapping of Levels to Resources; Partner—Use of Metadata; and Security Tokens—Issuance/Exchange, Token Renewal, Cancellation, Delegation and Impersonation Rules.

Canonical Migration Framework

Conventional solutions support migration through a process that either requires downtime for full upgrade or support coexistence features in combination with an extensive product certification process to ensure that two given versions of a AM component/product can work together. The certification process is not scalable since it is very time consuming and expensive. Being mission critical systems, the downtime approach is a non-starter for AM components/products. Thus, a new migration architecture is provided that facilitates a deployment model and design pattern enabling different versions of AM components/products to coexist is needed to address the zero downtime requirements. In addition, the ability to isolate the coexistence modules such that they can be removed/decommissioned later when they are not needed any more is desirable.

More specifically, in one embodiment, a canonical migration architecture is provided that allows existing and legacy access management solutions to be migrated in a phased and minimally disruptive manner. It also decouples client and server types and versions from each other thereby allowing mixing-n-matching legacy and newer clients and/or servers in existing deployments. This allows for future-proofing a customer's current investment in a specific version of an Access Management product by allowing point upgrades of individual pieces/products with the assurance that existing infrastructure will continue to work.

Figure 9:
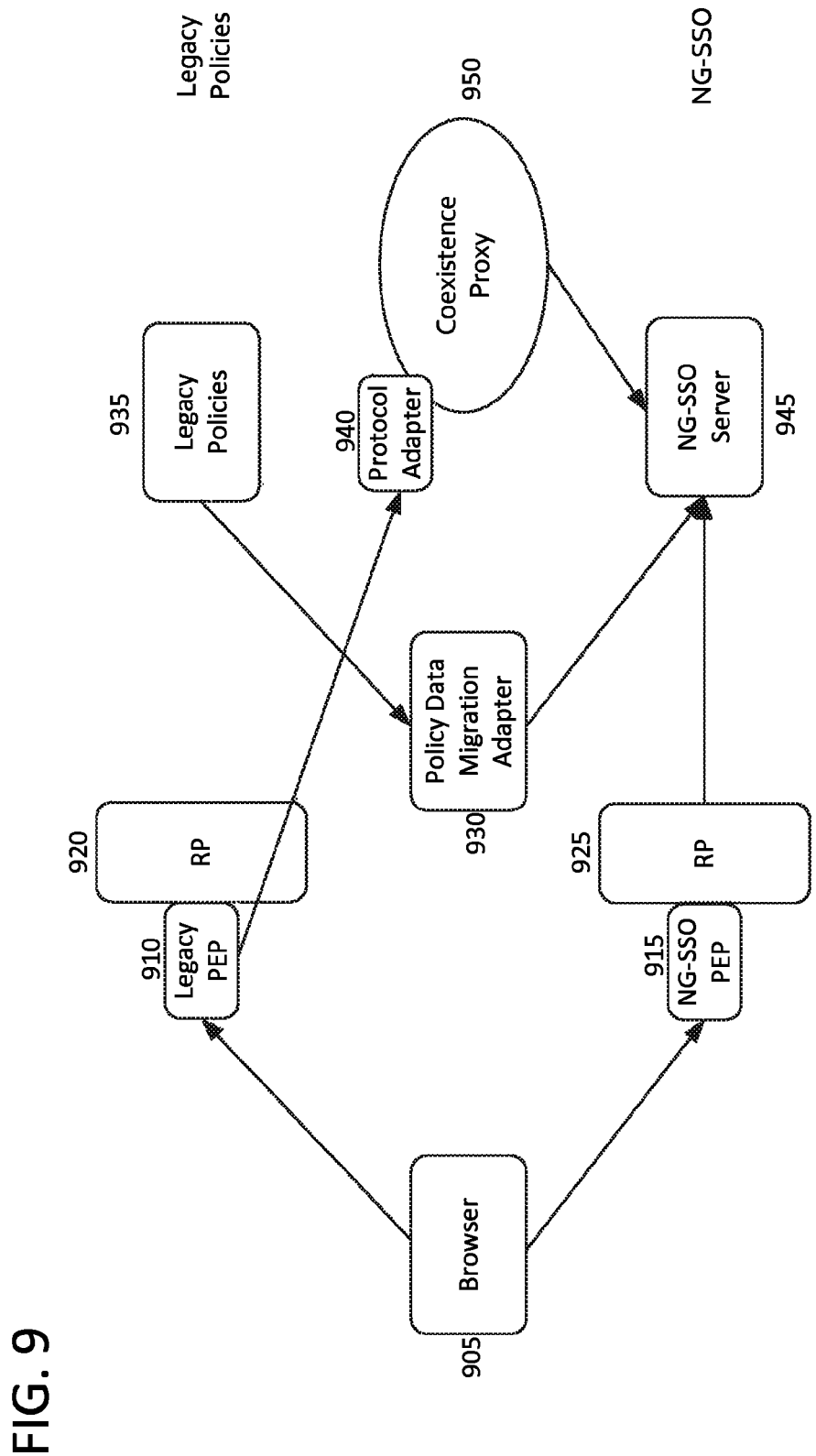
FIG. 9 shows an example of a migration pattern that is applicable to an access management product.
Figure 10:
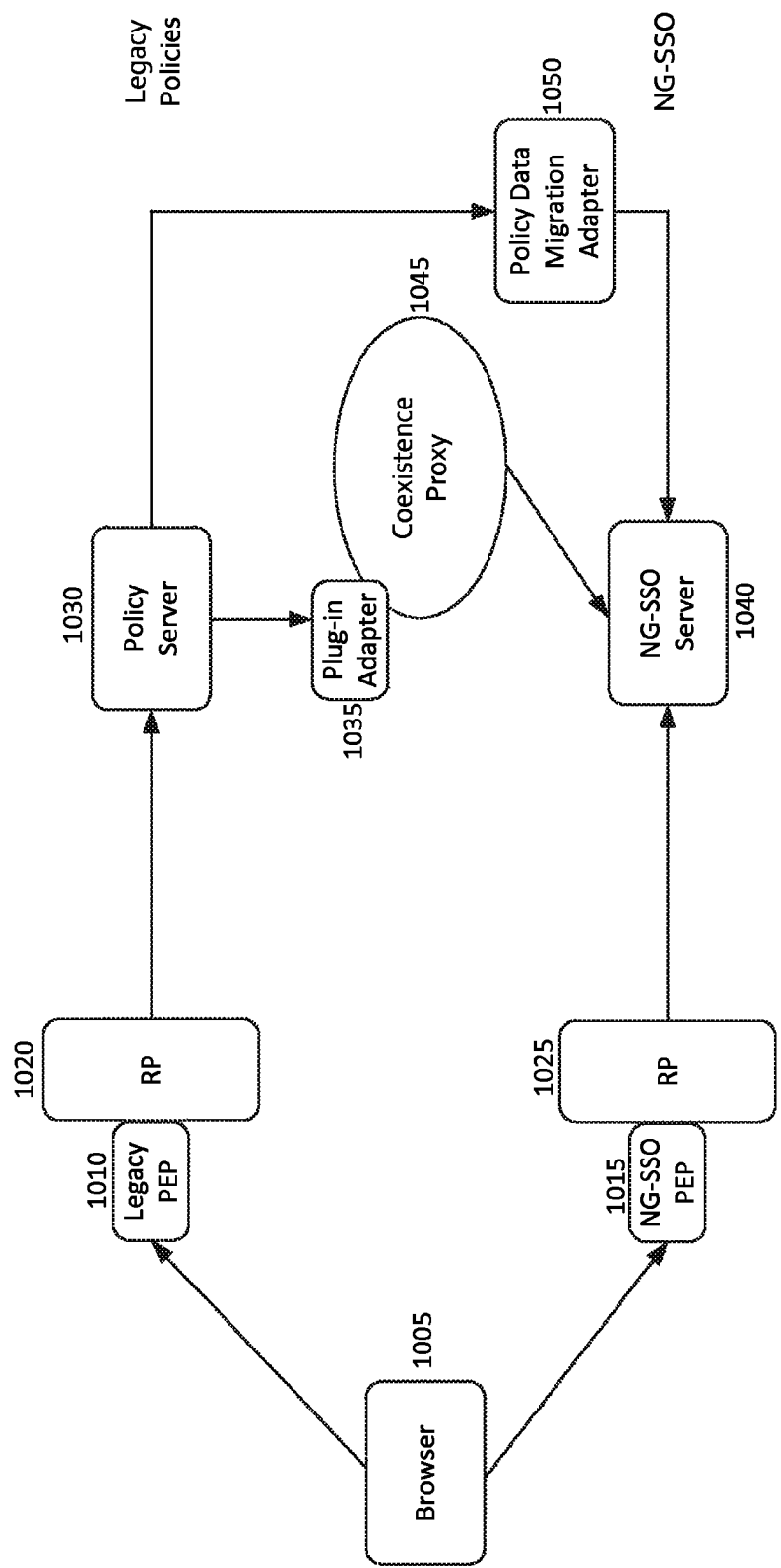
FIG. 10 shows an example of a migration pattern that is applicable to an access management product.

FIG. 9 and FIG. 10 show examples of two migration patterns that are applicable to an access management product. In an embodiment, the access management system 610 facilitates incremental migration of AM deployments while ensuring availability of the AM deployment during the migration process, which is critically necessary since any downtime of the AM deployment results in Enterprise Apps between inaccessible.

In FIG. 9, customers want to use the expressiveness of the next generation SSO policies for a subset of the legacy apps. In an embodiment, customers will need to migrate legacy policies to the new NG-SSO/current solution policies using the policy data migration adapters. The legacy policy server will delegate to the above policy processing to the co-existence proxy via the plugin adapter. For example, a browser 905 may connect to a legacy policy enforcement point 910 to request access to relying party 920. In response the legacy policy enforcement point 910 communicates with a protocol adapter 940 that interacts with coexistence proxy 950. Coexistence proxy 950 accesses the NG-SSO server 945. Meanwhile, legacy policies 935 may be migrated to NG-SSO server 945 using a policy data migration adapter 930. When the NG-SSO policy enforcement point 915 is associated with a relying party such as relying party 925, interaction may be made directly with the NG-SSO server 945. Support for existing policy enforcement points may remain until the migration is complete in order to facilitate a less disruptive migration to the NG-SSO server 945.

In FIG. 10, Customers migrate legacy policies to NG-SSO policies using the policy data migration adapter. Customers want to continue using legacy PEPs and migrate to NG-SSO PEPs in an incremental manner. Legacy PEPs now communicate with the Coexistence Proxy via the Protocol Adapter which acts as a protocol bridge between the legacy and NG-SSO Servers. For example, a browser 1005 may connect to a legacy policy enforcement point 1010 to request access to relying party 1020. In response the legacy policy enforcement point 1010 communicates with a policy server 1030, which then communicates with plug-in adapter 1035. Plug-in adapter 1035 interacts with coexistence proxy 1045, and coexistence proxy 950 accesses the NG-SSO server 945. Meanwhile, legacy policies may be migrated from policy server 1030 to NG-SSO server 1040 using a policy data migration adapter 1050. When the next generation single sign on policy enforcement point 1015 is associated with a relying party such as relying party 1025, interaction may be made directly with the NG-SSO server 1040. Support for existing policy enforcement points may remain until the migration is complete in order to facilitate a less disruptive migration to the NG-SSO server 1040.

An embodiment of the present invention provides a single product that is capable of supporting the combined feature set of the multiple Access Management products. This architecture enables convergence of existing products are based on different centers, have incompatible architectures and are built using different languages and technologies. In an embodiment, an access management architecture improves scalability and maintainability.

Hardware Overview

Figure 11:
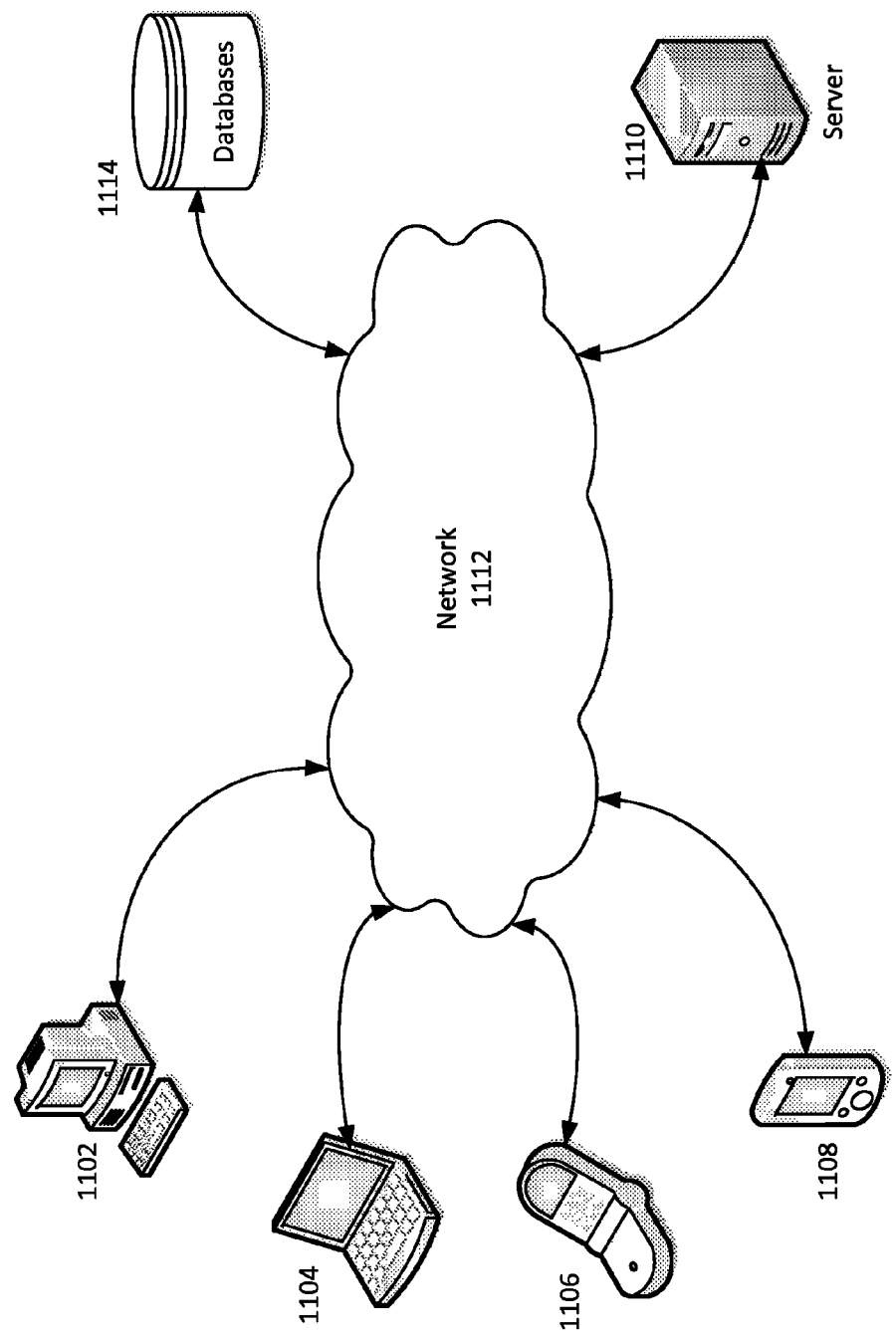
FIG. 11 is a simplified block diagram illustrating physical components of a system environment that may be used in accordance with an embodiment of the present invention.

FIG. 11 is a simplified block diagram illustrating physical components of a system environment 1100 that may be used in accordance with an embodiment of the present invention. This diagram is merely an example, which should not unduly limit the scope of the claims. One of ordinary skill in the art would recognize many variations, alternatives, and modifications.

As shown, system environment 1100 includes one or more client-computing devices 1102, 1104, 1106, 1108 communicatively coupled with a server computer 1110 via a network 1112. In one set of embodiments, client-computing devices 1102, 1104, 1106, 1108 may be configured to run one or more components of a graphical interface described above.

Client-computing devices 1102, 1104, 1106, 1108 may be general purpose personal computers (including, for example, personal computers and/or laptop computers running various versions of Microsoft Windows and/or Apple Macintosh operating systems), cell phones or PDAs (running software such as Microsoft Windows Mobile and being Internet, e-mail, SMS, Blackberry, and/or other communication protocol enabled), and/or workstation computers running any of a variety of commercially-available UNIX or UNIX-like operating systems (including without limitation the variety of GNU/Linux operating systems). Alternatively, client-computing devices 1102, 1104, 1106, and 1108 may be any other electronic devices capable of communicating over a network (e.g., network 1112 described below) with server computer 1110. Although system environment 1100 is shown with four client-computing devices and one server computer, any number of client-computing devices and server computers may be supported.

Server computer 1110 may be a general-purpose computer, specialized server computer (including, e.g., a LINUX server, UNIX server, mid-range server, mainframe computer, rack-mounted server, etc.), server farm, server cluster, or any other appropriate arrangement and/or combination. Server computer 1110 may run an operating system including any of those discussed above, as well as any commercially available server operating system. Server computer 1110 may also run any of a variety of server applications and/or mid-tier applications, including web servers, Java virtual machines, application servers, database servers, and the like. In various embodiments, server computer 1110 is adapted to run one or more Web services or software applications that provide the diagnostics functionality described above. For example, server computer 1110 may be configured to execute the various methods described in the various flowcharts described above.

As shown, client-computing devices 1102, 1104, 1106, 1108 and server computer 1110 are communicatively coupled via network 1112. Network 1112 may be any type of network that can support data communications using any of a variety of commercially-available protocols, including without limitation TCP/IP, SNA, IPX, AppleTalk, and the like. Merely by way of example, network 1112 may be a local area network (LAN), such as an Ethernet network, a Token-Ring network and/or the like; a wide-area network; a virtual network, including without limitation a virtual private network (VPN); the Internet; an intranet; an extranet; a public switched telephone network (PSTN); an infrared network; a wireless network (e.g., a network operating under any of the IEEE 802.11 suite of protocols, the Bluetooth protocol known in the art, and/or any other wireless protocol); and/or any combination of these and/or other networks. In various embodiments, the client-computing devices 1102, 1104, 1106, 1108 and server computer 1110 are able to access the database 1114 through the network 1112. In certain embodiments, the client-computing devices 1102, 1104, 1106, 1108 and server computer 1110 each has its own database.

System environment 1100 may also include one or more databases 1114. Database 1114 may correspond to an instance of integration repository as well as any other type of database or data storage component described in this disclosure. Database 1114 may reside in a variety of locations. By way of example, database 1114 may reside on a storage medium local to (and/or resident in) one or more of the computers 1102, 1104, 1106, 1108, 1110. Alternatively, database 1114 may be remote from any or all of the computers 1102, 1104, 1106, 1108, 1110 and/or in communication (e.g., via network 1112) with one or more of these. In one set of embodiments, database 1114 may reside in a storage-area network (SAN) familiar to those skilled in the art. Similarly, any necessary files for performing the functions attributed to the computers 1102, 1104, 1106, 1108, 1110 may be stored locally on the respective computer and/or remotely on database 1114, as appropriate. In one set of embodiments, database 1114 is a relational database, such as Oracle 11g available from Oracle Corporation that is adapted to store, update, and retrieve data in response to SQL-formatted commands. In various embodiments, database 1114 stores data that is used for providing diagnostic capabilities as described above.

Figure 12:
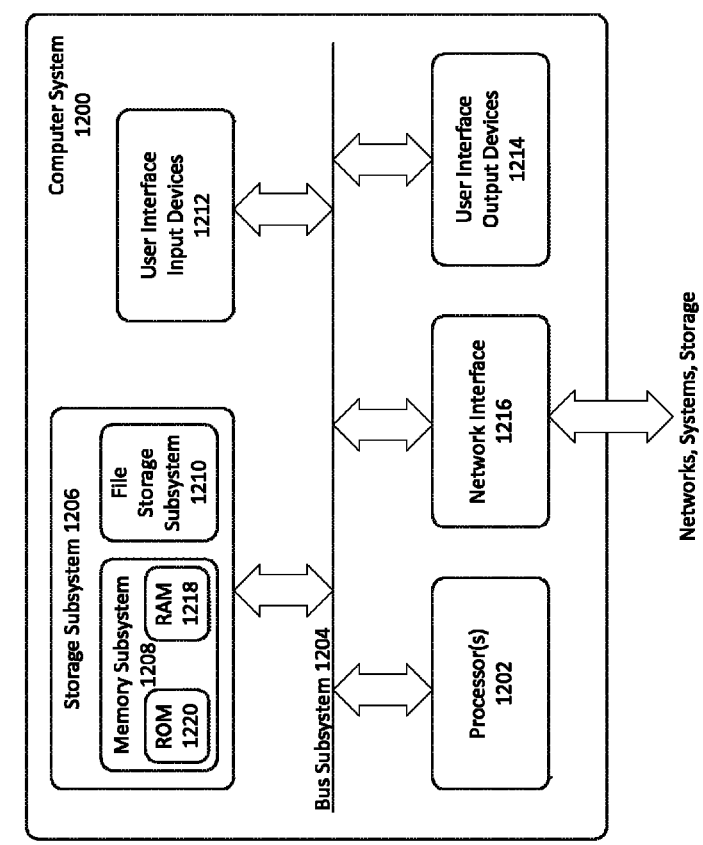
FIG. 12 is a simplified block diagram of a computer system that may be used to practice an embodiment of the present invention.

FIG. 12 is a simplified block diagram of a computer system that may be used to practice an embodiment of the present invention. Computer system 1200 may serve as a processing system 102 depicted in FIG. 1. In various embodiments, computer system 1200 may be used to implement any of the computers 1102, 1104, 1106, 1108, 1110 illustrated in system environment 1100 described above. As shown in FIG. 12, computer system 1200 includes a processor 1202 that communicates with a number of peripheral subsystems via a bus subsystem 1204. These peripheral subsystems may include a storage subsystem 1206, comprising a memory subsystem 1208 and a file storage subsystem 1210, user interface input devices 1212, user interface output devices 1214, and a network interface subsystem 1216.

Bus subsystem 1204 provides a mechanism for letting the various components and subsystems of computer system 1200 communicate with each other as intended. Although bus subsystem 1204 is shown schematically as a single bus, alternative embodiments of the bus subsystem may utilize multiple busses.

Network interface subsystem 1216 provides an interface to other computer systems, networks, and portals. Network interface subsystem 1216 serves as an interface for receiving data from and transmitting data to other systems from computer system 1200.

User interface input devices 1212 may include a keyboard, pointing devices such as a mouse, trackball, touchpad, or graphics tablet, a scanner, a barcode scanner, a touch screen incorporated into the display, audio input devices such as voice recognition systems, microphones, and other types of input devices. In general, use of the term "input device" is intended to include all possible types of devices and mechanisms for inputting information to computer system 1200.

User interface output devices 1214 may include a display subsystem, a printer, a fax machine, or non-visual displays such as audio output devices, etc. The display subsystem may be a cathode ray tube (CRT), a flat-panel device such as a liquid crystal display (LCD), or a projection device. In general, use of the term "output device" is intended to include all possible types of devices and mechanisms for outputting information from computer system 1200.

Storage subsystem 1206 provides a non-transitory computer-readable storage medium for storing the basic programming and data constructs that provide the functionality of the present invention. Software (programs, code modules, instructions) that when executed by a processor provide the functionality of the present invention may be stored in storage subsystem 1206. These software modules or instructions may be executed by processor(s) 1202. Storage subsystem 1206 may also provide a repository for storing data used in accordance with the present invention. Storage subsystem 1206 may comprise memory subsystem 1208 and file/disk storage subsystem 1210.

Memory subsystem 1208 may include a number of memories including a main random access memory (RAM) 1218 for storage of instructions and data during program execution and a read only memory (ROM) 1220 in which fixed instructions are stored. File storage subsystem 1210 provides persistent (non-volatile) storage for program and data files, and may include a hard disk drive, a floppy disk drive along with associated removable media, a Compact Disk Read Only Memory (CD-ROM) drive, an optical drive, removable media cartridges, and other like storage media.

Computer system 1200 can be of various types including a personal computer, a portable computer, a workstation, a network computer, a mainframe, a kiosk, a server or any other data processing system. Due to the ever-changing nature of computers and networks, the description of computer system 1200 depicted in FIG. 12 is intended only as a specific example for purposes of illustrating the preferred embodiment of the computer system. Many other configurations having more or fewer components than the system depicted in FIG. 12 are possible.

What is claimed is:

1. A system, comprising:
one or more central processing units;
an access metadata repository of access metadata objects, wherein each access metadata object of a plurality of access metadata objects in the access metadata repository describes data associated with access services;
input/output logic configured to receive, from a first application, a first access request for a security token associated with a second application;
service management logic configured to determine a first request type associated with the first access request;
normalization logic configured to generate a first normalized access request; and
component management logic configured to select a first functional component to satisfy at least a portion of the first normalized access request based at least in part on the first normalized access request and an access metadata object associated with the first request type, said component management logic further configured to cause the first functional component to generate a first token that authorizes the first application to make changes associated with the second application on behalf of a user of the first application.

2. The system of claim 1, wherein:
the component management logic is further configured to provide at least a portion of the first normalized access request to the first functional component; and
the component management logic is further configured to cause the first functional component to generate at least a portion of a first response that conforms with the first request type associated with the first access request; and
the service management logic is further configured to provide at least the portion of the first response to the first application.

3. The system of claim 2, wherein:
the first application is a trusted application.

4. The system of claim 3, wherein:
the input/output logic is further configured to receive a second access request from a second requesting entity, wherein the second access request includes a request for a security token associated with an identity provider;
the normalization logic is further configured to generate a second normalized access request;
the component management logic is further configured to cause the first functional component to generate a second token that authorizes access to the third application;
wherein the first functional component is configured to generate the first taken in response to receiving at least a portion of the first normalized request; and
wherein the first functional component is configured to generate the second token in response to receiving at least a portion of the second normalized request.

5. The system of claim 1, wherein the request includes composite state information that identities a state associated with a first functional component and a state associated with a second functional component.

6. The system of claim 1, further comprising:
an access policy repository configured to store access policy metadata for determining whether a request for access should be granted;
a second functional component configured to generate a response that includes information associated with the access policy metadata to the first application in response to determining that the first normalized access request does not meet the criteria specified by the access policy metadata.

7. The system of claim 1, wherein:
the input/output logic is further configured to receive a second access request from a second requesting entity;
the service management logic is further configured to determine a second request type associated with the second access request;
the normalization logic is further configured to generate a second normalized access request;
the component management logic is further configured to select the first functional component to satisfy at least a portion of the second normalized access request based at least in part on the second normalized access request and an access metadata object associated with the second request type;
the normalization logic is further configured to provide at least a portion of the second normalized access request to the first functional component; and
the component management logic is further configured to cause the first functional component to generate at least a portion of a second response that conforms with second request type associated with the second access request; and the service management logic is further configured to provide at least the portion of the first response to the first application.

8. A method, comprising:
maintaining an access metadata repository of access metadata objects, wherein each access metadata object of a plurality of access metadata objects in the access metadata repository describes data associated with access services;
receiving, from a first application, a first access request for a security token associated with a second application;
determining a first request type associated with the first access request;
generating a first normalized access request;
based at least in part on the first normalized access request and an access metadata object associated with the first request type, selecting a first functional component to satisfy at least a portion of the first normalized access request; and
causing the first functional component to generate a first token that authorizes the first application to make changes associated with the second application on behalf of a user of the first application;
wherein the method is performed by one or more computing devices.

9. The method of claim 8, further comprising:
providing at least a portion of the first normalized access request to the first functional component;
generating at least a portion of a first response using the first functional component, the first response conforming with the first request type associated with the first access request; and
providing at least the portion of the first response to the first application.

10. The method of claim 9, wherein:
the first application is a trusted application.

11. The method of claim 10, further comprising:
receiving a second access request from a second requesting entity, wherein the second access request includes a request for a security token associated with an identity provider;
generating a second normalized access request;
generating a second token that authorizes access to the third application;
wherein the first token is generated by a token generation engine in response to receiving at least a portion of the first normalized request at the token generation engine;
wherein the second token is generated by the token generation engine in response to receiving at least a portion of the second normalized request at the token generation engine.

12. The method of claim 8, wherein the request includes composite state information that identifies a state associated with a first functional component and a state associated with a second functional component.

13. The method of claim 8, further comprising:
maintaining an access policy repository that stores access policy metadata for determining whether a request for access should be granted;
in response to determining that the first normalized access request does not meet the criteria specified by the access policy metadata, generating a response to the first application that includes information associated with the access policy metadata.

14. The method of claim 8, further comprising:
receiving a second access request from a second requesting entity;
determining a second request type associated with the second access request;
generating a second normalized access request;
based at least in part on the second normalized access request and an access metadata object associated with the second request type, selecting the first functional component to satisfy at least a portion of the second normalized access request;
providing at least a portion of the second normalized access request to the first functional component;
generating at least a portion of a second response using the first functional component, the second response conforming with the second request type associated with the second access request; and
providing at least the portion of the first response to the first application.

15. A computer-readable non-transitory storage medium storing a plurality of instructions executable by one or more processors, the plurality of instructions comprising:
maintaining an access metadata repository of access metadata objects, wherein each access metadata object of a plurality of access metadata objects in the access metadata repository describes data associated with access services;
receiving, from a first application, a first access request for a security token associated with a second application;
determining a first request type associated with the first access request;
generating a first normalized access request;
based at least in part on the first normalized access request and an access metadata object associated with the first request type, selecting a first functional component to satisfy at least a portion of the first normalized access request; and
causing the first functional component to generate a first token that authorizes the first application to make changes associated with the second application on behalf of a user of the first application;
wherein the method is performed by one or more computing devices.

16. The computer-readable non-transitory storage medium of claim 15, wherein the instructions further include instructions that cause the one or more processors to perform:
providing at least a portion of the first normalized access request to the first functional component;
generating at least a portion of a first response using the first functional component, the first response conforming with the first request type associated with the first access request; and
providing at least portion of the first response to the first application.

17. The computer-readable non-transitory storage medium of claim 16, wherein:
the first application is a trusted application.

18. The computer-readable non-transitory storage medium of claim 17, wherein the instructions further include instructions that cause the one or more processors to perform:
receiving a second access request from a second requesting entity, wherein the second access request includes a request for a security token associated with an identity provider;
generating a second normalized access request;
generating a second token that authorizes access to the third application;
wherein the first token is generated by a token generation engine in response to receiving at least a portion of the first normalized request at the token generation engine;

wherein the second token is generated by the token generation engine in response to receiving at least a portion of the second normalized request at the token generation engine.

19. The computer-readable non-transitory storage medium of claim 15, wherein the request includes composite state information that identifies a state associated with a first functional component and a state associated with a second functional component.

20. The computer-readable non-transitory storage medium of claim 15, wherein the instructions further include instructions that cause the one or more processors to perform:
- receiving a second access request from a second requesting entity;
- determining a second request type associated with the second access request;
- generating a second normalized access request;
- based at least in part on the second normalized access request and an access metadata object associated with the second request type, selecting the first functional component to satisfy at least a portion of the second normalized access request;
- providing at least a portion of the second normalized access request to the first functional component;
- generating at least a portion of a second response using the first functional component, the second response conforming with the second request type associated with the second access request; and
- providing at least the portion of the first response to the first application.

* * * * *

UNITED STATES PATENT AND TRADEMARK OFFICE
CERTIFICATE OF CORRECTION

PATENT NO. : 8,955,037 B2
APPLICATION NO. : 13/464906
DATED : February 10, 2015
INVENTOR(S) : Srinivasan et al.

It is certified that error appears in the above-identified patent and that said Letters Patent is hereby corrected as shown below:

In the specification

In column 5, line 56, change "marshaling" to -- marshalling --.

In column 6, line 34, change "marshaling" to -- marshalling --.

In the claims

In column 20, line 27, in claim 4, delete "taken" and insert -- token --, therefor.

In column 20, line 33, in claim 5, delete "identities" and insert -- identifies --, therefor.

In column 20, line 65, in claim 7, after "with" insert -- the --.

In column 22, line 50, in claim 16, after "least" insert -- the --.

Signed and Sealed this
Seventeenth Day of November, 2015

Michelle K. Lee
*Director of the United States Patent and Trademark Office*